Patented Oct. 26, 1926.

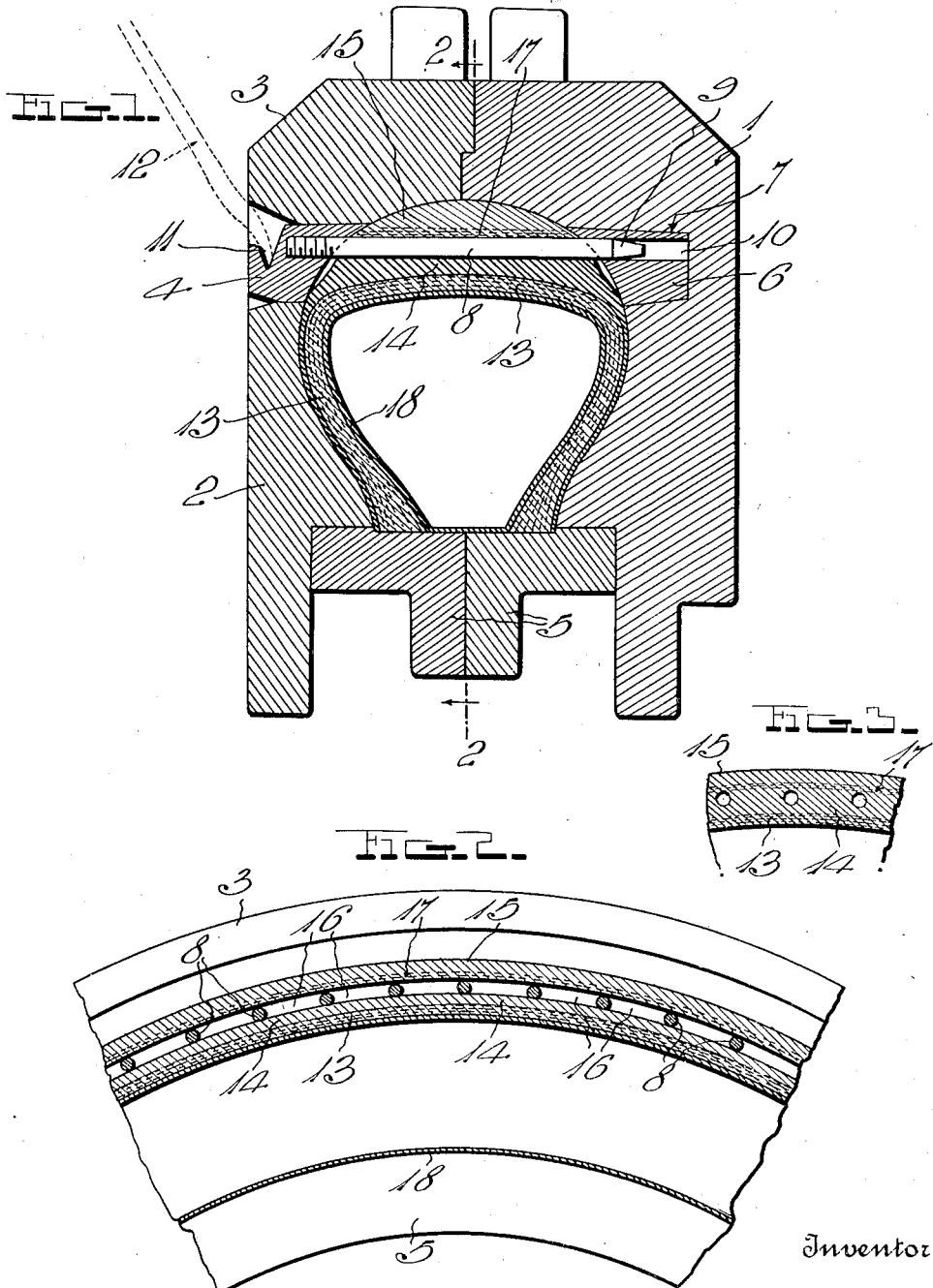

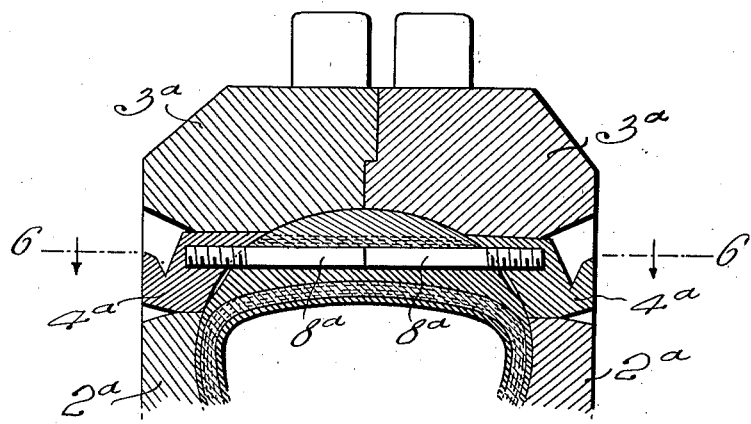
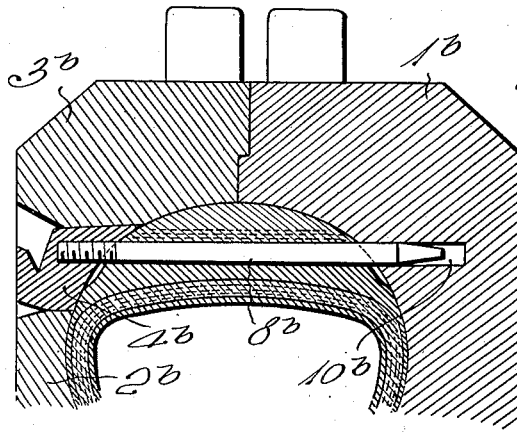
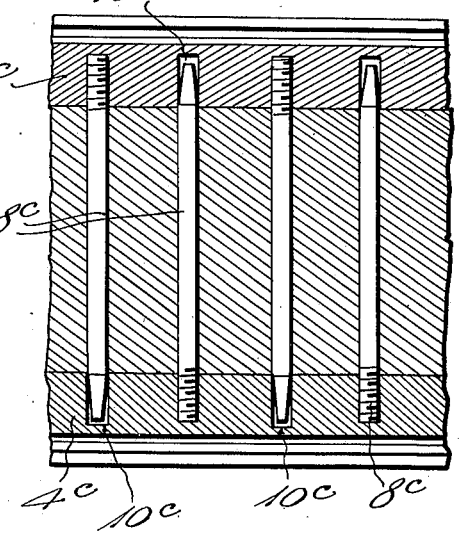

1,604,450

UNITED STATES PATENT OFFICE.

FREDERICK A. KRUSEMARK, OF AKRON, OHIO, ASSIGNOR TO LAMBERT TIRE & RUBBER CO., OF BARBERTON, OHIO, A CORPORATION OF ARIZONA.

TIRE-CONSTRUCTING MOLD.

Application filed November 26, 1924. Serial No. 752,407.

My invention relates to the construction of combined pneumatic and cushion tires, in which the thick cushioning tread is provided with a plurality of transverse openings. Cores are used to form the openings through the tread, and the principal object of this invention is to make unique provision whereby said cores may be removed from the tire while the latter is firmly held by mold sections which have shaped it.

With the foregoing in view, the invention resides in the novel subject matter hereinafter described and claimed, the description being supplemented by the accompanying drawings.

Figure 1 is a vertical transverse sectional view showing one form of mold and illustrating a partly completed tire therein.

Figure 2 is a vertical sectional view on line 2—2 of Fig. 1.

Figure 3 is a detail longitudinal sectional view of a portion of the tread of the completed tire.

Figures 4 and 5 are transverse sectional views showing different forms of molds.

Figure 6 is a view cut in a manner indicated by the line 6—6 of Fig. 4, but showing a construction which differs from the construction illustrated in that figure.

The mold structure illustrated in Figs. 1 and 2 comprises one annular side member 1, an opposite side composed of inner and outer annular sections 2 and 3 and a ring 4 between them, a pair of bead-forming rings 5, and a second ring 6 which is inset in a groove 7 in the inner side of the mold section 1. The numerous sections of the mold may be secured together in any desired manner and their interiors form a complete molding chamber for a tire. The ring 4 carries a plurality of core pins 8 which are adapted to extend transversely across the tread-forming portion of this chamber, said pins having tapered ends 9 receivable in openings 10 in the ring 6. This ring is readily removable from the recess 7 when the mold is disassembled, and in order to permit the ring 4 to be outwardly moved from the mold sections 2 and 3, after the formation of a tire, so as to withdraw the pins 9 from said tire, the outer corner of said ring is cut away and is provided with a groove or the like 11, so that a lever 12 or other desired means may be engaged with the ring for prying it outwardly. This construction permits the core pins to be readily removed without injury to the tire since the latter is firmly held by the mold structure.

In constructing a tire by the use of a mold such as that described, or other suitable apparatus, I form a carcass and an annular tread member, assemble said carcass and tread member with a quantity of green rubber between them, and with a plurality of cores in engagement with said green rubber, relatively move said carcass and tread member radially to crowd the green rubber around the cores, vulcanize the tread member, green rubber and carcass together, and remove the cores.

Specifically speaking, I may first build up a carcass 13, in any desired manner. To the tread portion of this carcass I apply a thickness 14 of green rubber. The pins 8 are disposed across this thickness of green rubber, one or both of the rings 4 and 6 being then in engagement with said pins to hold them in properly spaced relation. I then apply a tread-forming band 15 of green rubber around the pins 8, leaving spaces 16 between the green rubber 14 and the green rubber 15, at opposite sides of the pins 8. The tread-forming band 15 preferably includes an inelastic fabric or cord strip 17.

The steps so far referred to may be performed before the mold sections 1, 2 and 3 are applied to the tire and engaged with the rings 4 and 6, and before the mold is completely assembled about said tire, the usual inflatable air bag 18 is inserted. Then, after the mold has been assembled about the tire, the air bag is inflated and its pressure forces the tread portion of the carcass 13 radially outward, so that the green rubber 14 is crowded outwardly between the pins 8 into contact with the inner side of the tread-forming band 15. Then, the entire mold and its contents are subjected to a proper heat treatment, so that the entire structure is vulcanized and the green rubber 14 is caused to unite with the tread-forming band 15. When the vulcanizing process is completed, a lever 12 or equivalent means may be employed to pry or move the ring 4 outwardly, thus withdrawing the core pins 8 from the tread portion of the tire, leaving transverse openings through said tread portion. This having been done, the rest of the mold may be disassembled and the completed tire removed.

Instead of following the steps previously enumerated, the tread portion proper of the tire may be built around the core ring containing the pins without first engaging these pins with the tire carcass. Then, the tread portion formed on the core pins, may be placed in the mold independently of the tire carcass, the latter being afterwards inserted into the mold, it being of course immaterial as to whether the carcass, tread member and pins are inserted simultaneously or at different times. It is also possible to first build the tread portion of the tire on a building drum, after which it could be disengaged from the drum and placed over the core pins, after which the procedure would be as above outlined.

In Fig. 4, I have illustrated a slightly different mold structure in which opposite sides of the mold, each include an inner annular section $2^a$, an outer annular section $3^a$ and a ring $4^a$ between the two sections. These rings $4^a$ carry inwardly projecting core pins $8^a$, opposed pins co-acting in forming the openings through the tire tread. The method of constructing the tire with this form of mold is substantially the same as with the form of construction first described.

In Fig. 5, a mold is shown comprising inner and outer annular sections $2^b$ and $3^b$ at one side of the mold, a ring $4^b$ between said sections, core pins $8^b$ projecting from said ring, and a main annular side member $1^b$. All of this construction is similar to that shown in Fig. 1, but instead of using the second ring 6, to receive the free ends of the pins $8^b$, I merely form openings $10^b$ in the inner side of the mold section $1^b$.

Fig. 6 discloses a construction similar to Fig. 4, but the core-forming pins $8^c$ extend throughout the width of the mold and are carried alternately by the opposite rings $4^c$ which correspond to the rings $4^a$, the free ends of said pins being received in sockets $10^c$ in the inner sides of the rings.

It will be seen that the rings 11, $4^a$ and $4^b$ have flat outer side faces which are flush with the flat outer faces of the adjacent mold sections when the core pins are in their proper positions. This feature insures the core pins being properly positioned when the tire molds are stacked one upon another in the usual vulcanizer.

It will be seen from the foregoing that I have devised a very advantageous mold for use in constructing tires of a combined pneumatic and cushion type, having transverse openings through the cushioning tread.

The process of constructing tires as herein set forth is claimed in my copending application No. 80,784 filed Jan. 12, 1926.

I claim:—

1. A tire mold comprising sections to give shape to the tire, and a core-carrying ring constituting a mold section associated with said aforementioned sections and removable therefrom to permit the withdrawal of the cores from the tire while the latter is firmly held by others of the mold sections.

2. A tire mold comprising sections to give shape to the tire, and a core-carrying ring associated with said sections and removable therefrom to permit the withdrawal of the cores from the tire while the latter is firmly held by the mold sections, said rim having tool-engaging means, the adjacent portions of one of the mold sections serving as a fulcrum for the tool engaged with said means.

3. A tire mold comprising a plurality of detachable mold sections, one of the latter being in the form of a narrow ring positioned between two adjacent sections, an annular series of pin-like cores fixed to said ring section, the latter having on its outer portion means to be engaged by a tool fulcrumed on an adjacent mold section, whereby said ring section and cores may be removed from the tire while the latter is firmly held by the remaining mold sections.

4. A tire mold comprising a plurality of detachable mold sections to shape the sides and tread of a tire and including two opposed ring-like sections at the tread portion, one of the ring-like sections having fixed thereto an annular series of pin-like transverse cores to enter a corresponding series of openings in the other ring-like section when the mold is assembled, the ring section carrying the core pins being removable from the molded tire while the latter is still firmly held by other mold sections.

5. A tire mold comprising sections to give shape to the tire, and a core-carrying ring associated with said sections and removable therefrom to permit the withdrawal of the cores from the tire while the latter is firmly held by the mold sections, said ring being adapted to lie with the outer face flush with the outer face of the mold section with which it is associated.

6. A tire mold comprising sections to give shape to the tire and a core-carrying ring having a face portion adapted to engage and form a portion of the tire surface, associated with said sections and removable therefrom to permit the withdrawal of the cores from the tire while the latter is firmly held by the mold sections.

In testimony whereof I have hereunto affixed my signature.

FREDERICK A. KRUSEMARK.